United States Patent [19]
Faris

[11] Patent Number: 5,729,406
[45] Date of Patent: Mar. 17, 1998

[54] LIGHTWEIGHT ACTUATOR IN A COMPUTER MASS MEMORY STORAGE DEVICE

[75] Inventor: Jeffrey E. Faris, Richardson, Tex.

[73] Assignee: Texas Instruments Incorporated, Dallas, Tex.

[21] Appl. No.: 772,540

[22] Filed: Dec. 24, 1996

[51] Int. Cl.⁶ ........................................... G11B 5/55
[52] U.S. Cl. ............................................ 360/106
[58] Field of Search ........................... 360/106, 98.01

[56] References Cited

U.S. PATENT DOCUMENTS

| | | | |
|---|---|---|---|
| 5,251,085 | 10/1993 | Morris et al. | 360/106 |
| 5,510,940 | 4/1996 | Tacklind et al. | 360/106 |

*Primary Examiner*—John H. Wolff
*Attorney, Agent, or Firm*—Ronald O. Neerings; James C. Kesterson; Richard L. Donaldson

[57] ABSTRACT

A disk-based drive (45) with a reduced weight actuator (50) is disclosed. The actuator (50) includes an E-block (30) having multiple actuator arms (32) extending therefrom, to which associated read/write heads (14) are attached. The E-block 30 is formed of top and bottom plates (30u, 30d) having openings (31u, 31d) therethrough for receiving a pivot pin (36). A roller bearing (34) having inner and outer races (38i, 38u) and ball bearings (39) therewithin is disposed about the pivot pin (36), between the top and bottom plates (30u, 30d) as installed. In a first embodiment, the inner race (38i) of the bearing (34) is fixably attached to the pivot pin (36) and the pivot pin (36) is fixably attached to the E-block (30). Supports (44) are attached to the outer race (38o) of the bearing (34). A voice coil (37) is mounted to the rear of the E-block (30) to rotate the E-block (30) and position the heads (14) over the desired track of the disks (8). In this embodiment, the inner race (38o) and pivot pin (36) rotate with the E-block (30), while the outer race (38o) remains fixed. The mass and rotational inertia of the disclosed actuator (50), as well as the disk drive access time, is thus reduced from conventional designs. An alternative embodiment is also disclosed, in which ring jewel bearings (45) are placed within the lop and bottom plates (30d', 30u') of the E-block (30'), within which a fixed pivot pin (36') is disposed.

29 Claims, 4 Drawing Sheets

LIGHTWEIGHT ACTUATOR IN A COMPUTER MASS MEMORY STORAGE DEVICE

BACKGROUND OF THE INVENTION

This invention is in the field of computer mass memory storage devices, and is more specifically directed to actuators for disk-based storage drives useful in portable computers.

Fixed magnetic disk systems, typically referred to as "hard" disk drives, are now commonplace as the main non-volatile storage in modern personal computers, workstations, and portable computers. Such hard disk drives are now capable of storing gigabyte quantifies of digital data, even when implemented in portable computers of the so-called "notebook" class. Rapid advances in reducing the size and weight of hard disk drives, particularly as applied to portable computers, have been made over recent years, enabling the widespread availability of portable computers weighing below five pounds yet having state-of-the art capability and performance.

Of course, further miniaturization of portable computer systems continues to be desirable so that higher levels of performance can become available in yet smaller and lighter packages, enabling wider Use of data processing systems over a wider range of applications. One of the limitations in obtaining such further miniaturization is the weight and size of the hard disk drive in the portable computer, considering the nature of its mechanical and magnetic components.

Figure 1:
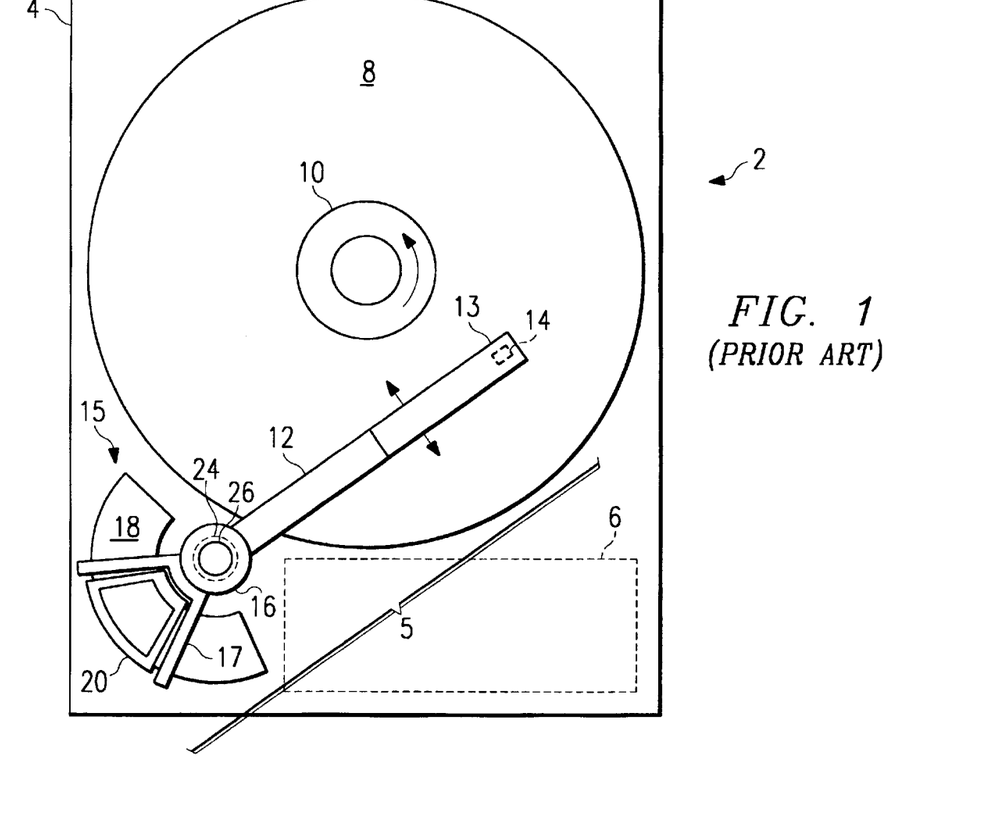
FIG. 1 is a schematic plan view of a disk drive system according to the prior art.

FIG. 1 illustrates, in plan view, hard disk drive system 2 constructed according to conventional techniques. Hard disk drive system 2 is contained within rectangular case 4 which provides structural, contaminant, and EMI shielding for disk drive system 2 when its top cover is included (the top cover not shown in FIG. 1). Within case 4 are some of the drive electronics 6 (shown in shadow) for signal amplification, and multiple disks 8 (only one of which is visible in the plan view of FIG. 1) that are coated with magnetically sensitive material and upon which data is stored at locally magnetized regions. Disks 8 are rotated by spindle 10, which is driven by a spindle motor (not shown).

In conventional disk drive system 2, actuator 5 performs the function of accessing a desired location of disks 8 to write data thereto or read data therefrom. Actuator 5 includes various components, including E-block 16, actuator or suspension arms 12 with flexures 13 and read/write heads 14 attached thereto, bearing 24 (which is often implemented as a cartridge bearing), voice coil motor 15, and the associated electronic interface cable (not shown) to drive electronics 6. As illustrated in FIG. 1, E-block 16 is rotatable about pivot pin 26 by operation of conventional voice coil motor 15.

Pivot pin 26 is fixably attached to case 4 so as not to rotate therewithin; typically, pivot pin 26 is either threaded into case 4, or is pressed into a slightly undersized hole therein. Pivot pin 26 is also pressed into bearing 24, which aligns the actuator pivoting axis with the pivot axis of pin 26. In typical 2.5" hard drives, actuator 5 is supported by pressing the pivot pin 26 into a thin amount of material in the case 4. The walls of case 4 are typically 1.0 to 1.5 mm thick, with local bosses that add 1.0 mm to the local thickness of the case 4 at those locations. An adhesive may be used to further retain the pivot pin 26 in the case where the interference between case 4 and pivot pin's 26 is relatively small.

The angular position of E-block 16 places read/write heads 14 at a selected radial distance of disks 8, corresponding to the track of the disk at which access is desired. As such, in this conventional multiple disk drive system, multiple actuator arms 12 are interleaved among the multiple disks 8 in disk drive system 2, only the top one of which is visible in FIG. 1. Voice coil motor 15, according to this conventional configuration, positions read/write heads 14 at the desired radial location, or track, of disks 8.

Figure 2:
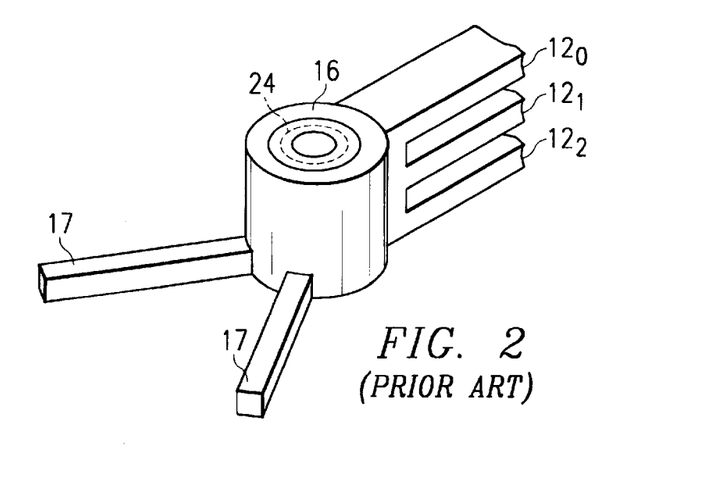
FIG. 2 is a perspective view of a portion of the actuator in the disk drive system of FIG. 1 according to the prior art.

Referring now to FIGS. 1 and 2 in combination, the construction of conventional actuator 5 will be described in further detail. As shown in FIG. 2, E-block surrounds bearing 24, and has multiple actuator arms $12_0$ through $12_3$ extending therefrom. Pivot pin 26 (not shown in FIG. 2) fits within an inner passage of bearing 24, as noted above. In typical disk drives for portable computers, pivot pin 26 (and thus the passage in bearing 24) is on the order of 2 mm in diameter, while the diameter of bearing 24 is on the order of 10 mm (including mounting flanges). The overall outside diameter or width of E-block 16 thus ranges to on the order of 12 to 17 mm in conventional 2.5" disk drives. In a typical example of a typical two platter 2.5" hard disk drive, actuator 5 weighs 4 to 6 grams, of which 1 to 2 grams is contributed by ball bearing 24 and 1.5 to 2 grams is contributed by E-block 16, excluding the wire for the voice coil motor 15. Thus, the weight of E-block 16 is typically a significant portion of the overall weight of actuator 5. In addition, the height of the combination of E-block 16, bearing 24, and pivot pin 26 is usually the determining feature of the overall height of the hard drive.

Figure 3:
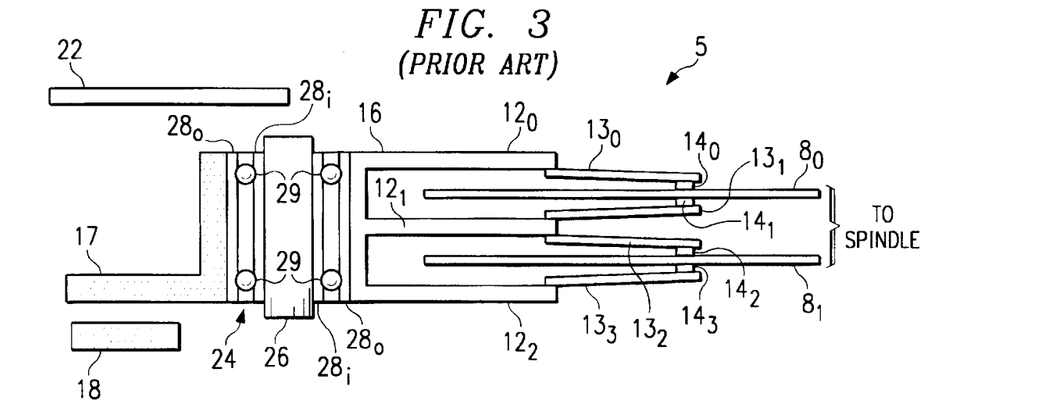
FIG. 3 is an elevation cross-sectional view of the actuator in the disk drive system of FIG. 1 according to the prior art.

FIG. 3 illustrates conventional actuator 5 in a cross-sectional view. In this example, three actuator arms $12_0$ through $12_2$ extend from E-block 16 on the opposing side from bracket 17. As shown in FIGS. 1 through 3, bracket 17 supports voice coil 20. Voice coil 20 is a coil of multiple turns of wire, typically as 135 to 150 turns of small-gauge copper wire for a 65 mm disk (as used in a 2.5" hard drive), arranged in a quasi-trapezoidal form and supported by bracket 17. As illustrated in the cross-sectional view of FIG. 3, bracket 17 and thus voice coil 20 (not visible in FIG. 3), is disposed between permanent magnet 18 and shield 22. Permanent magnet 18 is typically a surface-magnetized body that generates a substantially vertical magnetic field in the vicinity of voice coil 20, so that current conducted by voice coil 20 exerts a torque on E-block 16, changing the position of read/write heads 14. Shield 22 confines this magnetic field generated by magnet 18; in place of shield 22, some conventional voice coil motors provide a second permanent magnet above voice coil 20, of similar size as magnet 18.

Flexure $13_0$ is attached to the underside of the distal end of actuator arm $12_0$ from pivot pin 26, and has read/write head $14_0$ attached to its distal end. Flexures $13_1$, $13_2$ are attached to the opposing sides of the distal end of actuator arm $12_1$, and have read/write heads $14_1$, $14_2$, respectively, attached thereto. Similarly, flexure $13_3$ is attached to the top side of the distal end of actuator arm $12_2$, and has read/write head $14_3$ attached thereto. Read/write heads $14_0$, $14_1$ are maintained proximate the top and bottom surfaces of upper disk $8_0$, respectively, and read/write heads $14_2$, $14_3$ are maintained proximate the top and bottom surfaces of lower disk $8_1$, respectively, by negative pressure between slider portions of heads 14 and the corresponding surfaces of disks 8 when disks 8 are rotating, in the conventional manner.

The construction of bearing 24 is also illustrated in cross-section in FIG. 3. Bearing 24 typically includes inner race $28i$ and outer race $28o$, between which a plurality of ball bearings 29 are disposed. As illustrated in FIG. 3, two sets of ball bearings 29 are typically included within bearing 24, one set near the top and one set, near the bottom, to provide the appropriate degree of stiffness. In this example, inner race 28i is stationary, and in a fixed position relative to pivot pin 26, while outer race 28o is fixably attached to E-block 16 so as to rotate therewith. A torque generated by coil 20 will thus cause E-block 16 and outer race 28o to rotate about inner race 28i and pivot pin 26, with the rotation facilitated by bail bearings 29 in bearing 24. Voice coil motor 15 thus must be capable of rotating the mass of E-block 16 in combination with outer race 28o, along with the mass of bracket 17 and coil 20 itself, in positioning actuator arms 12 and heads 14 to the desired disk track.

The access time of actuator 5 is a function of the rotational velocity of spindle 10 and the time required to move actuator 5 to the required radial location. The movement of actuator 5 to the required location is typically the largest component of the access time. As noted above, movement of actuator 5 is accomplished by voice coil motor 15, which creates a torque around the pivot axis. The output torque is a function of the friction of bearing 24, the inertia of actuator 5, and the electrical resistance of the coil of voice coil 15. Typical hard drives have access times of 12 to 16 milliseconds.

BRIEF SUMMARY OF THE INVENTION

It is an object of the present invention to provide a hard disk drive actuator with significantly reduced mass.

It is a further object of the present invention to provide such a hard disk drive actuator in which the torque requirements on the voice coil motor are reduced.

It is a further object of the present invention to provide a disk drive having such an actuator in which the access time of the disk drive is reduced.

Other objects and advantages of the present invention will be apparent to those of ordinary skill in the art having reference to the following specification together with its drawings.

The invention may be implemented in a hard disk drive actuator in which an E-block is formed to have top and bottom plates, with an opening therebetween within which a pivot pin and bearing is disposed. As a result of this construction, the mass and footprint of the actuator is reduced from conventional actuators, enabling reduction in the size of the disk drive itself and also improving disk access times.

In a first embodiment, the top and bottom plates of the E-block contact a rotating pivot pin. The rotating pivot pin rotates with an inner race of a roller bearing, the outer race of which is fixably attached to the case of the disk drive. The roller bearing is located along the pivot pin, between the top and bottom plates of the E-block. In an alternative embodiment, jewel bearings are provided within the openings of the top and bottom plates of the E-block, in contact with a stationary pivot pin about which the E-block rotates.

DETAILED DESCRIPTION OF THE INVENTION

Referring now to

Figure 4A:
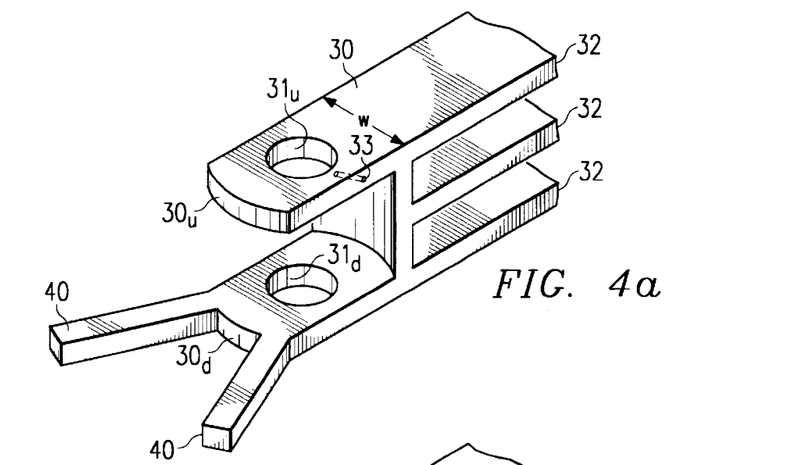
FIG. 4a is a perspective view of an E-block and actuator arms in an actuator according to a first preferred embodiment of the invention.

FIG. 4a, the construction of an actuator according to a first preferred embodiment of the invention will now be described. FIG. 4a illustrates E-block 30 having multiple actuator arms 32 (which are truncated in FIG. 4a) extending therefrom on one side, the overall shape of which gives rise to the name "E-block". Conventional flexures and read/write heads are attached to the distal ends of actuator arms 32, in the conventional manner, but are not shown in FIG. 4a, for the sake of clarity. E-block 30 is formed of upper plate 30u and lower plate 30d, each having an opening 31u, 31d, respectively, therethrough for receiving a pivot pin as will be described hereinbelow. Plates 30u, 30d are on the order of 1.0 to 1.5 mm in thickness. Bracket arms 40 extend from lower plate 30d, to which a conventional voice coil motor may be mounted in the conventional manner. E-block 30, including actuator arms 32 and bracket arms 40, is preferably cast, molded, or machined from a lightweight material such as aluminum, in a unitary fashion; alternatively, actuator arms 32 and bracket arms 40 may be attached to form E-block 30 by way of crimping, adhesive bonding, or such other bonding technique as suitable for the particular material.

As illustrated in FIG. 4a, the construction of E-block 30 has a much reduced mass from that of conventional E-blocks, as no material is present between plates 30u, 30d. In addition, it is contemplated that the size of E-block 30 itself is reduced from that of conventional E-blocks to a width W of on the order of 6 to 8 mm (as opposed to typical E-block widths of 12 to 17 mm in conventional actuators). The reduction in width is primarily obtained because openings 31 need only be large enough to accept a pivot pin (typically having a diameter on the order of 2 to 3 mm), and not an entire bearing cartridge, as will be described in detail hereinbelow.

Figure 4B:
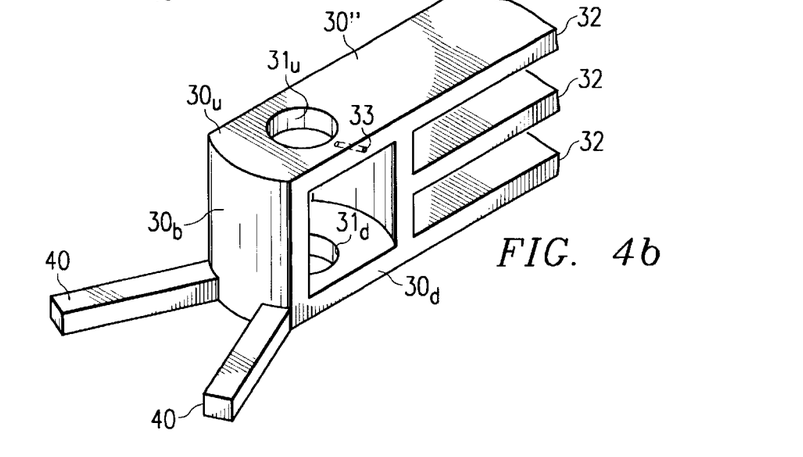
FIG. 4b is a perspective view of an E-block and actuator arms in an actuator according to an alternative embodiment of the invention.

FIG. 4b illustrates E-block −30 according to an alternative embodiment of the invention, in which a back wall 30b is provided along the side of E-block −30 adjacent bracket arms 40. Back wall 30b, while adding slightly to the overall mass of E-block −30, provides additional stability for the mounting of the voice coil motor to bracket arms 40. It is contemplated, however, that conventional materials such as aluminum are sufficiently rigid to support the voice coil motor from bracket arms 40, and that therefore E-block 30 according to FIG. 4a will be suitable for most applications, and provide reduced mass and rotational inertia. The remainder of the following description will therefore be provided in regards to E-block 30 of FIG. 4a, it being understood that E-block −30 may alternatively be utilized in the present invention.

As will also be described in further detail hereinbelow, E-block 30 is fixably attached to a pivot pin, so that the pivot pin and E-block 30 will rotate together. The pivot pin may be pressed into E-block 30, or upper plate 30u of E-block 30 may include a tapped hole 33 for receiving a shoulder screw or set screw to secure E-block 30 to a pivot pin as shown. Lower plate 30d may also include a tapped hole, if desired for additional stability.

Figure 5:
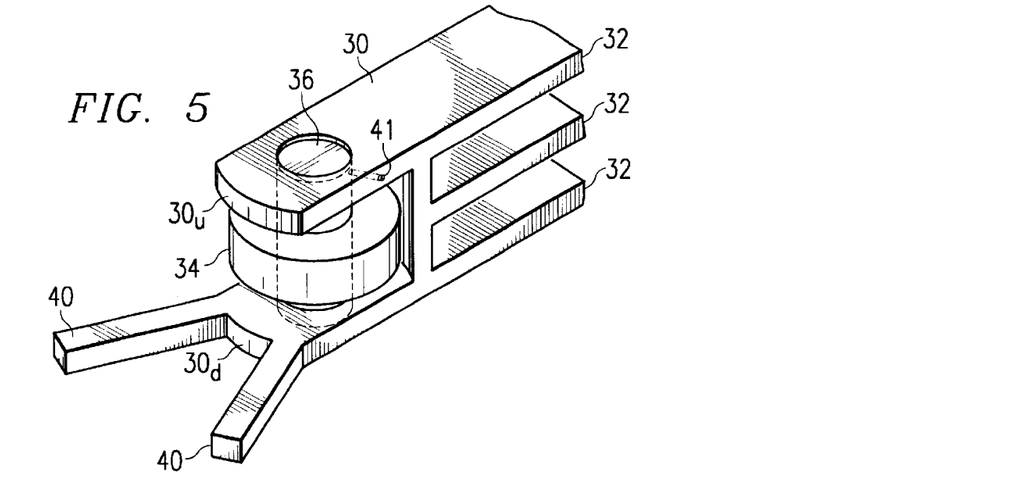
FIG. 5 is a perspective view of an actuator according to the preferred embodiment of the invention, including the bearing and pivot pin.

Referring now to FIG. 5, E-block 30 is illustrated as assembled together with bearing 34 and pivot pin 36. Pivot pin 36 is secured within E-block 30, either by a press fit or a set screw as described above. Pivot pin 36 preferably does not extend out of opening 31u, above the top surface of plate 30u of E-block 30, nor out of opening 31d below the bottom surface of plate 30d of E-block 30. According to this embodiment of the invention, pivot pin 36 is not secured to any other element of the disk drive outside of E-block 30, but instead rotates together with E-block 30 as actuator arms 32 are positioned.

Bearing 34 is a roller bearing or set of bearings secured about pivot pin 36 by way of a press fit; snap rings or other positioning systems may be used to secure bearing 34 to pivot pin 36. Pivot pin 36 and E-block 30 rotate freely relative to the outer surface of bearing 34, corresponding to the outer race of the bearing when implemented as a ball bearing cartridge. The height and position of bearing 34 may be selected so as to contact neither the bottom surface of upper plate 30u nor the top surface of lower plate 30d as shown, or alternatively may be of a size and shape such that only its inner race contacts upper plate 30u and lower plate 30d, in either case reducing undesired friction. The outer diameter of bearing 34 must be larger than width W of E-block 30 to allow the case to attach to and support bearing 34.

Figure 6:
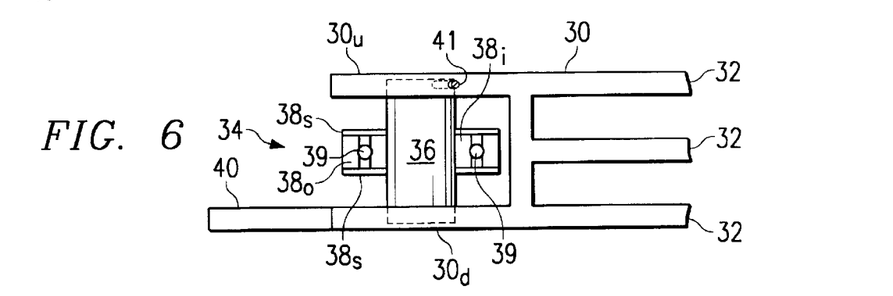
FIGS. 6 and 7 are cross-sectional views of the actuator according to the preferred embodiment of the invention.

FIG. 6 illustrates, in cross-section, the construction of bearing 34, as installed within E-block 30 in combination with pivot pin 36. Pivot pin 36 is held in place by way of set screw 41, which is inserted into tapped hole 33, and tightened against pivot pin 36. An additional set screw may be inserted either on another side of pivot pin 36 through upper plate 30u, or through a hole in lower plate 30d, if desired.

As shown in FIG. 6, bearing 34 is a ball bearing cartridge according to this preferred embodiment of the invention, having an inner race 38i and an outer race 38o, and with a set of ball bearings 39 within and between races 38i, 38o. Inner race 38i is in contact with and fixably attached to pivot pin 36, such that inner race 38i and pivot pin 36 rotate together with one another in a unitary fashion, relative to outer race 38o. Bearing 34 is preferably of the sealed type, so that lubrication may be maintained therewithin and prevented from migrating to disk surfaces or to read/write heads (which, of course, would degrade disk performance). In this example, bearing 34 is sealed by way of sealing flanges 38s on the tops and bottoms of bearing 34, that provide a seal in the conventional manner while permitting inner race 38i to rotate relative to outer race 38o. In the case where one set of ball bearings 39 are provided as shown, axial preloading of the bearing may be desired in order to compensate for any axial play in bearing 34. Alternatively, multiple sets of ball bearings 39 may be provided within bearing 34 to provide additional stiffness for actuators requiring more than two platters, to the extent that space permits.

Figure 7:
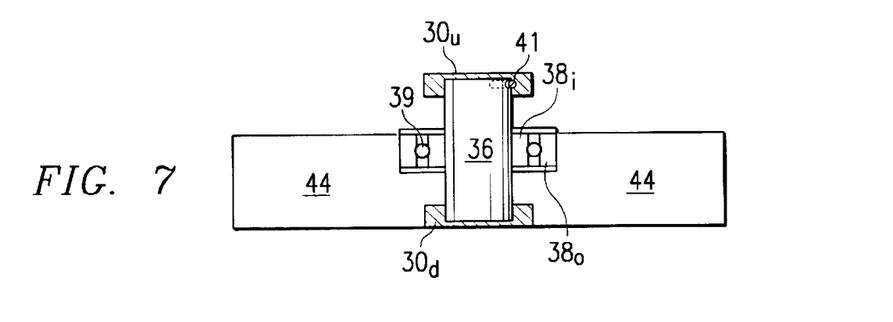

According to this embodiment of the present invention, outer race 38o of bearing 34 is held in a fixed position, while inner race 38i, in a fixed relationship with pivot pin 36 and E-block 30, freely rotates relative to outer race 38o in response to torque generated by the voice coil motor held by brackets 40. FIG. 7 illustrates supports 44 which are fixably attached to outer race 38o of bearing 34, and which are in a fixed position within the disk drive. Supports 44 may be molded plastic or another material that is formed in a unitary manner relative to the case of the disk drive; alternatively, supports 44 may be formed of a material that is fastened to the bottom or top of the disk drive case. In either case, supports 44 are attached to outer race 38o of bearing 34, preferably by way of a press fitting, or by an epoxy or other adhesive. Supports 44 are preferably tall enough to suspend bottom plate 30d above the "floor" of the disk drive system, permitting free rotation of E-block 30 and pivot pin 36.

Figure 8:
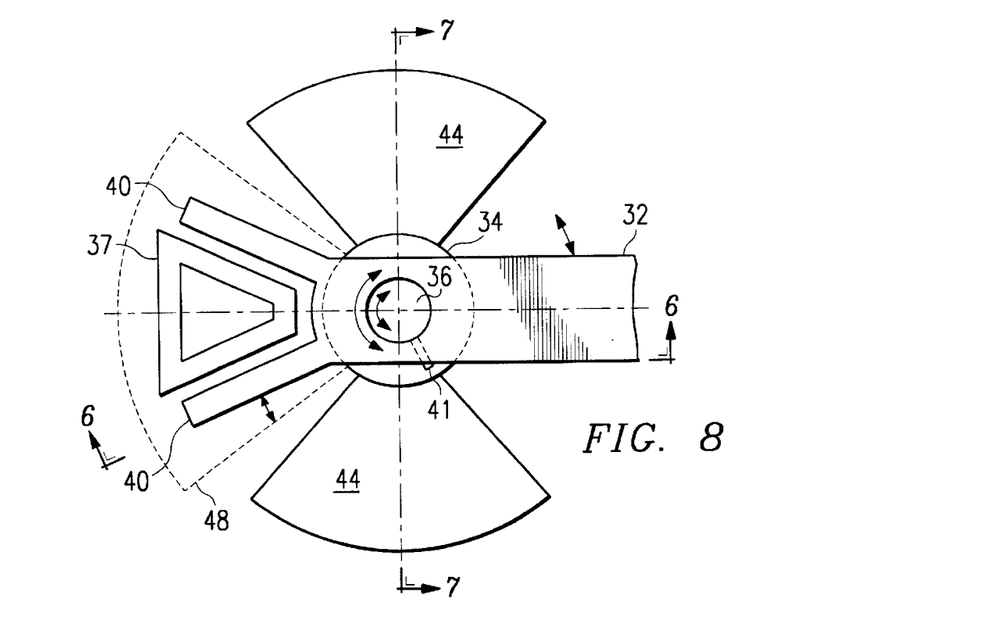
FIG. 8 is a plan view of the actuator according to the preferred embodiment of the invention, illustrating its mounting within a disk drive.

FIG. 8 illustrates, in plan view, the actuator according to the preferred embodiment of the invention as installed into a disk drive system. As shown in FIG. 8, the diameter of bearing 34 extends beyond the sides of E-block 30; these extending sides are fixably attached to and supported by supports 44, as shown in FIGS. 7 and 8. In FIG. 8, voice coil 37 is shown as attached to and between bracket arms 40, extending from the opposite side of E-block 30 from actuator arms 32. In the conventional manner, voice coil 37 is disposed above permanent magnet 48, which is shown in shadow in FIG. 8; an overlying shield or additional magnet may also be in place above voice coil 37 in the conventional manner. Supports 44 are shaped, in plan view, in such a manner as to provide adequate clearance for the placement of magnet 48 and for the rotation of voice coil 37 and brackets 40 on the one side of E-block 30, and for the rotation of actuator arms 32 on the other side.

Figure 9:
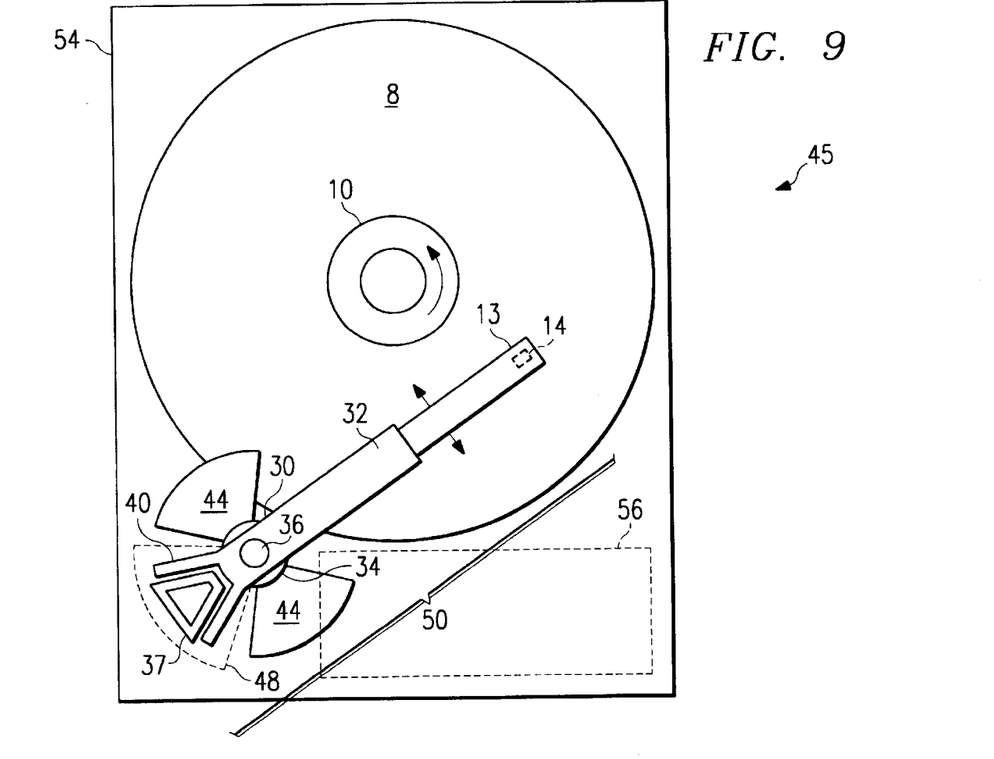
FIG. 9 is a schematic plan view of a disk drive system according to the preferred embodiment of the invention.

Referring now to FIG. 9, disk drive 45 including actuator 50 constructed according to the preferred embodiment of the present invention is described in detail. Like elements in disk drive 45 as in the conventional disk drive 2 described hereinabove are referred to by the same reference numerals.

Disk drive 45 includes case 54, the top of which is removed in the plan view of FIG. 9. Multiple disks 8 rotate around spindle 10 under the drive of a spindle motor, in the conventional manner and as described hereinabove.

According to this preferred embodiment of the invention, actuator 50 includes E-block 30 constructed as described hereinabove, having actuator arms 32 (only the top one of which is visible in FIG. 9). Flexures 13 are attached to the distal ends of actuator arms 32, and have read/write heads 14 attached thereto. Read/write heads 14 are in electrical communication with drive electronics 56 within case 54. Drive electronics 56 are constructed according to conventional techniques. Because of the reduced foot-print of disk drive 45 relative to conventional disk drive, and because the length of case 45 is largely dependent upon the space required by actuator 50, however, drive electronics 56 also occupy a reduced footprint, as may be readily implemented according to modern integrated circuit techniques.

Actuator 50 also includes, as described hereinabove, voice coil 37 disposed above magnet 48 and mounted to bracket arms 40; again, an overlying shield or second magnet is not shown in the plan view of FIG. 9, for clarity. Supports 44 are either unitary with, or attached to, the bottom of case 54, and in turn are attached to bearing 34 to fix its outer race in position. As described hereinabove, pivot pin 36 is fixably attached to E-block 30, and thus rotates as actuator arms 32 are rotated.

In operation, voice coil 37 receives a current drive from drive electronics 56 in the conventional manner, to effect rotational movement of actuator arms 32 and read/write heads 14 attached thereto. The current conducted by voice coil 37 interacts with the magnetic field generated by magnet 48 to produce a torque upon voice coil 37. Because voice coil 37 is mounted to bracket arms 40 of E-block 30, this torque rotates E-block 30 and pivot pin 36 about the central axis of pivot pin 36. Referring to FIGS. 7 and 8 in combination with FIG. 9, support for this rotation is provided by bearing 34, as inner race 38i of bearing 34 rotates along with pivot pin 36 and E-block 30, while outer race 38o of bearing 34 remains angularly fixed to supports 44. The rotation of E-block 30 results in rotation of actuator arms 32, and thus in the positioning of read/write heads 14 at the desired track of magnetic disks 8 in disk drive 45. Drive electronics 56 effects conventional servo control of the current through voice coil 37, responsive to feedback signals regarding the angular position of E-block 30, to ensure the proper placement of heads 14 at the desired track of disks 8. According to the preferred embodiment of the present invention, significant advantages in the implementation of hard disk drives, particularly in portable computers where weight and volume are of concern, may be obtained. Firstly, the weight of the actuator is reduced by the elimination of much of the material of the actuator, according to the present invention. Considering that the mass of the E-block is a large portion of the overall mass of the actuator, that the width of the actuator is reduced by on the order of 50%, and that the material in the vertical direction is reduced by on the order of 60%, the rotating weight reduction provided according to the present invention is significant, on the order of 50 to 60%, even including the additional mass of the rotating pivot pin. This reduction in rotational mass has the benefit of reducing the access time of the disk drive, considering that the mass to be rotated is much less than that of conventional disk drive actuators. A 50% reduction in mass is contemplated to yield approximately a 30% reduction in disk access time.

Secondly, the form factor of the actuator is also reduced according to the present invention. For the same access time as conventional designs, the reduced rotational mass of the actuator according to the present invention enables the use of the same voice coil motor design with a reduction in the length of the actuator bracket arms of 5 mm relative to the pivot axis. Conversely, a smaller voice coil motor may be used at the same distance from the pivot axis, to maintain the same access time as conventional actuators. Reduction in the volume of the disk drive is thus another important opportunity provided by the present invention, especially when implemented in portable computers.

Figure 10:
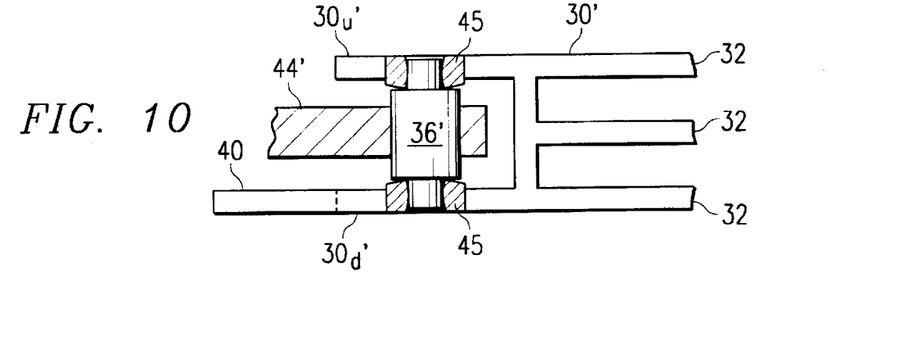
FIG. 10 is a cross-sectional view of the actuator according to an alternative embodiment of the invention.

Referring now to FIG. 10, according to an alternative embodiment of the invention, jewel bearings are implemented to reduce the moving mass of E-block 30'. In this case, pivot pin 36 is stationary, and moving mass is reduced further by eliminating the mass of the inner race of the roller bearing. Ring jewel bearings 45 are mounted in upper and lower plates 30u', 30d' of E-block 30', either by a press fit thereinto as shown in FIG. 10, or by threading each of plate 30u', 30d' and installing ring jewel bearings 45 into threaded carriers for proper location in E-block 30'. Ring jewel bearings 45 may be one of several types; in the example of FIG. 10, bearings 45 are implemented as sapphire Bombé olive ring jewels, each having a convex surface facing support 44'. In this example, the center hole of ring jewel bearings 45 have continually reduced diameter to the midpoint of the jewel thickness, at which point the diameter begins to continually increase. Pivot pin 36' in this alternative embodiment is a stepped shaft where the larger diameter step rides on the convex surface of ring jewel bearing 45 to provide support for thrust loads, and the smaller diameter rides inside the center holes thereof. Support 44' in this embodiment is attached to the case of the disk drive, for example as a plate extension thereof, and contacts the larger diameter inside step portion of pivot pin 36', keeping pivot pin 36' from rotating. In this embodiment of the invention, therefore, E-block 30' and ring jewel bearings 45 rotate about fixed pivot pin 36'.

According to this alternative embodiment of the present invention, the weight saving is at least 50% of the roller bearing weight or 20% of the actuator weight. As above, this reduced weight reduces the load upon the voice coil motor, enabling the use of a smaller voice coil motor or a reduction in the access time of the disk drive. Also, as discussed above, the form factor of the actuator is also reduced according to this alternative embodiment of the present invention, considering that the E-block is not located outside of the bearing.

Further in the alternative, it is contemplated that the actuator according to the present invention may be utilized to advantage in disk-based mass storage drives of types other than magnetic disk drives. Examples of such other disk-based drives include compact disk drives, CD-ROM drives, CD-R drives, digital video disk (DVD) drives, and the like.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. An actuator for a disk drive, comprising:
    a first actuator arm having top and bottom surfaces and an opening therethrough proximate a first end of said first actuator arm;
    a second actuator arm having top and bottom surfaces and an opening therethrough proximate a first end of said second actuator, said second actuator arm being securely spaced from said first actuator arm in an arrangement such that there is a void between said bottom surface of said first actuator arm and said top surface of said second actuator arm proximate said openings;
    a bearing in said void between said bottom surface of said first actuator arm and said top surface of said second actuator arm proximate said openings;
    a pivot pin extending through the openings in said first and second actuator arms and coupling said bearing to said first and second actuator arms; and
    a motor, attached to said second actuator arm, for exerting a torque upon said first and second actuator arms relative to a rotational axis of the pivot pin.

2. The actuator of claim 1, wherein bracket arms extend from said first end of said second actuator arm;
    and wherein the motor is attached to the bracket arms.

3. The actuator of claim 2, wherein the motor comprises:
    a voice coil, attached to the bracket arms; and
    a magnet, disposed near the voice coil, for generating a magnetic field in the vicinity of the voice coil.

4. The actuator of claim 1, wherein the pivot pin is in a fixed rotational position relative to said first and second actuator arms;
    and wherein the bearing has an inner race and an outer race, the inner race fixably attached to the pivot pin between the first and second actuator arms so that the pivot pin and inner race are rotatable relative to the outer race.

5. The actuator of claim 4, wherein the bearing further comprises:
a plurality of ball bearings disposed between the inner and outer races.

6. The actuator of claim 1, further comprising:
read/write heads, each attached proximate a second end of one of said first and second actuator arms.

7. The actuator of claim 1, wherein said first and second actuator arms further comprise:
a back plate attached to said first ends of said first and second actuator arms.

8. The actuator of claim 1, wherein the bearing comprises a jewel bearing.

9. The actuator of claim 8, wherein the jewel bearing comprises: first and second ring jewel bearings disposed within the openings of said first and second actuator arms, respectively, each of the first and second ring jewel bearings having a center hole within which the pivot pin is disposed, so that said first and second actuator arms are rotatable about the pivot pin.

10. A disk drive, comprising:
a case;
at least one magnetic disk rotatable on a spindle within the case;
an actuator, comprising:
a first actuator arm having top and bottom surfaces and an opening therethrough proximate a first end of said first actuator arm;
a second actuator arm having top and bottom surfaces and an opening therethrough proximate a first end of said second actuator, said second actuator arm being securely spaced from said first actuator arm in an arrangement such that there is a void between said bottom surface of said first actuator said surface of said second actuator proximate said openings;
read/write heads attached proximate a second end of said first and second actuator arms;
a bearing in said void between said bottom surface of said first actuator arm and said top surface of said second actuator arm proximate said openings;
a pivot pin extending through the openings in said first and second actuator arms and coupling said bearing to said first and second actuator arms;
a motor, attached to said second actuator arm, for exerting a torque upon said first and second actuator arms relative to a rotational axis of the pivot pin; and
at least one support attached to the case and fixably attached to the bearing.

11. The disk drive of claim 10, wherein the motor comprises:
a coil mounted to said second actuator arm; and
a magnet, disposed near the coil, for generating a magnetic field in the vicinity of the coil.

12. The disk drive of claim 11, wherein the actuator further comprises:
bracket arms extending from said first end of said second actuator arm, wherein the coil is mounted to the bracket arms.

13. The disk drive of claim 10, wherein the pivot pin is in a fixed rotational position relative to said first and second actuator arms;
and wherein the bearing has an inner race and an outer race, the inner race fixably attached to the pivot pin between the first and second actuator arms, and the outer race fixably attached to the at least one support, so that the pivot pin and inner race are rotatable relative to the outer race.

14. The disk drive of claim 13, wherein the at least one support comprises first and second supports disposed on opposite sides of the bearing.

15. The disk &ire of claim 13, wherein the bearing further comprises:
a plurality of ball bearings disposed between the inner and outer races.

16. The disk drive of claim 10, wherein the at least one magnetic disk comprises a plurality of disks, each having a top and bottom surface.

17. The disk drive of claim 10, wherein the first and second actuator arms further comprise:
a back plate attached to the first end of said first and second actuator arms.

18. The disk drive of claim 10, wherein the bearing comprises a jewel bearing.

19. The disk drive of claim 18, wherein the jewel bearing comprises:
first and second ring jewel bearings disposed within the openings of the first and second actuator arms, respectively, each of the first and second ring jewel bearings having a center hole within which the pivot pin is disposed, so that said first and second actuator arms are rotatable about the pivot pin;
wherein the at least one support is attached to the pivot pin.

20. A mass memory storage device, comprising:
a case;
at least one mass memory disk rotatable on a spindle within the case;
an actuator, comprising:
a first actuator arm having top and bottom surfaces and an opening therethrough proximate a first end of said first actuator arm;
a second actuator arm having top and bottom surfaces and an opening therethrough proximate a first end of said second actuator, said second actuator arm being securely spaced from said first actuator arm in an arrangement such that there is a void between said bottom surface of said first actuator and said top surface of said second actuator proximate said openings;
a plurality of sensors, each attached to a distal end of said first and second actuator arms so as to be in proximity to an associated mass memory disk, for reading information therefrom;
a bearing in said void between said bottom surface of said first actuator arm and said top surface of said second actuator arm proximate said openings;
a pivot pin extending through the openings in said first and second actuator arms and coupling said bearing to said first and second actuator arms;
a motor, attached to said second actuator arm, for exerting a torque upon said first and second actuator arms relative to a rotational axis of the pivot pin; and
at least one support attached to the case and fixably attached to the bearing.

21. The storage device of claim 20, wherein the motor comprises:
a coil mounted to said second actuator arm; and
a magnet, disposed near the coil, for generating a magnetic field in the vicinity of the coil.

22. The storage device of claim 21, wherein the actuator further comprises:

bracket arms extending from said first end of second actuator arm, wherein the coil is mounted to the bracket arms.

23. The storage device of claim 20, wherein the pivot pin is in a fixed rotational position relative to said first and second actuator arms; and wherein the bearing has an inner race and an outer race, the inner race fixably attached to the pivot pin between said bottom surface of said first actuator arm and said top surface of said second actuator arm, and the outer race fixably attached to the at least one support, so that the pivot pin and inner race are rotatable relative to the outer race.

24. The storage device of claim 23, wherein the at least one support comprises first and second supports disposed on opposite sides of the bearing.

25. The storage device of claim 23, wherein the bearing further comprises:

a plurality of ball bearings disposed between the inner and outer races.

26. The storage device of claim 20, wherein the at least one mass memory disk comprises a plurality of disks, each having a top and bottom surface.

27. The storage device of claim 20, wherein said first and second actuator arms further comprise:

a back plate attached to the first ends of said first and second actuator arms.

28. The storage device of claim 20, wherein the bearing comprises a jewel bearing.

29. The storage device of claim 28, wherein the jewel bearing comprises:

first and second ring jewel bearings disposed within the openings of the first and second actuator arms, respectively, each of the first and second ring jewel bearings having a center hole within which the pivot pin is disposed, so that said first and second actuator arms are rotatable about the pivot pin; and wherein the at least one support is attached to the pivot pin.

* * * * *